US012047729B2

(12) United States Patent
Romo et al.

(10) Patent No.: US 12,047,729 B2
(45) Date of Patent: Jul. 23, 2024

(54) EAR-FITTING HEADPHONE ATTACHMENT APPARATUS

(71) Applicant: D Squared Ventures, Aliso Viejo, CA (US)

(72) Inventors: Harry Duane Romo, Aliso Viejo, CA (US); David Hagopian, Irvine, CA (US)

(73) Assignee: D Squared Ventures, Aliso Viejo, CA (US)

( * ) Notice: Subject to any disclaimer, the term of this patent is extended or adjusted under 35 U.S.C. 154(b) by 0 days.

(21) Appl. No.: 18/141,623

(22) Filed: May 1, 2023

(65) Prior Publication Data

US 2023/0421944 A1 Dec. 28, 2023

Related U.S. Application Data

(63) Continuation of application No. 17/061,234, filed on Oct. 1, 2020, now Pat. No. 11,641,540.

(Continued)

(51) Int. Cl.
*H04R 1/10* (2006.01)

(52) U.S. Cl.
CPC ........... *H04R 1/105* (2013.01); *H04R 1/1016* (2013.01); *H04R 1/1066* (2013.01); *H04R 2420/07* (2013.01)

(58) Field of Classification Search
CPC .... H04R 1/105; H04R 1/1016; H04R 1/1066; H04R 2420/07; H04R 1/028;

(Continued)

(56) References Cited

U.S. PATENT DOCUMENTS

| | | | |
|---|---|---|---|
| 9,084,054 | B2 | 7/2015 | Prelogar et al. |
| 9,648,407 | B2 | 5/2017 | Harper |

(Continued)

FOREIGN PATENT DOCUMENTS

| | | |
|---|---|---|
| AU | 2020100454 | 4/2020 |
| JP | 3181508 | 2/2013 |

(Continued)

OTHER PUBLICATIONS https://www.vibeharsloef.com/collections/classic-ear/products/copy-of-caps-for-earphone-airpod-pearls-1, last accessed Sep. 2, 2022.

(Continued)

*Primary Examiner* — Angelica M McKinney
(74) *Attorney, Agent, or Firm* — Garson & Gutierrez, PC

(57) ABSTRACT

Ear-fitting headphone attachment apparatus, systems that utilize the aforementioned attachment apparatus, and methods of its manufacture and use. In one aspect, an attachment apparatus is disclosed. In one embodiment, the attachment apparatus includes a coiled wire having an interference dimension. The coiled wire includes an attachment point for the attachment of a decorative item. In another embodiment, the attachment apparatus includes an extruded or injection molded tube of material. A pair of wires wraps around the tube of material in opposite direction, the pair of wires residing around an outside perimeter of the tube of material and entering into the tube of material where it exits at a bottom portion of the tube of material. In yet another embodiment, the attachment apparatus includes a woven textile having a crosshatch pattern associated therewith. In yet another embodiment, the attachment apparatus includes thin metal strips that collectively have a crosshatch pattern associated therewith.

19 Claims, 10 Drawing Sheets

Related U.S. Application Data

(60) Provisional application No. 62/970,353, filed on Feb. 5, 2020, provisional application No. 62/909,602, filed on Oct. 2, 2019.

(58) Field of Classification Search
CPC .. H04R 1/1033; H04R 2460/17; A44C 25/00; A44C 15/00; A44C 15/0005; A44C 15/0015; A44C 15/003; A44C 15/0045
See application file for complete search history.

(56) References Cited

U.S. PATENT DOCUMENTS

| | | | |
|---|---|---|---|
| 9,888,309 B2 | 2/2018 | Prelogar et al. | |
| 9,942,645 B2 | 4/2018 | Prelogar et al. | |
| 9,980,540 B2 | 5/2018 | Kita | |
| 2016/0373851 A1 | 12/2016 | Prelogar et al. | |
| 2019/0222914 A1 | 7/2019 | Prasad et al. | |

FOREIGN PATENT DOCUMENTS

| | | | |
|---|---|---|---|
| JP | 2013055487 | 3/2013 | |
| KR | 200359121 | 8/2004 | |
| KR | 20090012625 | 12/2009 | |
| KR | 200464377 | 12/2012 | |
| KR | 102145035 | 8/2020 | |
| WO | 2009071837 | 6/2009 | |
| WO | WO-2009071837 A2 * | 6/2009 | ............ A44C 15/00 |

OTHER PUBLICATIONS https://mara.paris/shop/airpods-jewelry, last accessed Sep. 2, 2022.
https://www.delfinadelettrez.com/collections/unchain-my-art/products/pearl-sonic-earrings, last accessed Sep. 2, 2022.
https://www.mishodesigns.com/en-US/collections/pods, last accessed Sep. 2, 2022.
https://eu.louisvuitton.com/eng-e1/products/earphones-chain-s00-nvprod3300005v/M00529, last accessed Sep. 2, 2022.
https://www.bijules.me/, last accessed Sep. 2, 2022.
https://paired-earwear.com/en, last accessed Sep. 2, 2022.
https://sawalife.org/, last accessed Sep. 2, 2022.
https://www.gettapper.com/, last accessed Sep. 2, 2022.
https://www.amazon.com/FONY-Magnetic-Anti-Lost-Silicone-Connector/dp/B07RRK7CCR/ref=sr_1_7?gclid=CjwKCAjwldHsBRAoEiwAd0JybVDDm510ZLjf5rPDj7_nyaZlmIVIZfdPuc9adcCqz7S63q2QUcKK9RoCBukQAvD_BwE&hvadid=241941402442&hvdev=c&hvlocphy=9031342&hvnetw=g&hvpos=1t1&hvqmt=e&hvrand=3024944117012027134&hvtargid=kwd-337691197138&hydadcr=24659_10400692&keywords=airpod+accessory&qid=1570032905&sr=8-7, last accessed Oct. 2, 2019.

* cited by examiner

EAR-FITTING HEADPHONE ATTACHMENT APPARATUS

PRIORITY

This application is a continuation of, and claims the benefit of priority to, U.S. patent application Ser. No. 17/061,234 filed Oct. 1, 2020, entitled "EAR-FITTING HEADPHONE ATTACHMENT APPARATUS, AND METHODS OF MANUFACTURING AND USING THE SAME" of the same title, now U.S. Pat. No. 11,641,540, which claims the benefit of priority to U.S. Provisional Patent Application Ser. No. 62/970,353 filed Feb. 5, 2020 of the same title and U.S. Provisional Patent Application Ser. No. 62/909,602 filed Oct. 2, 2019 of the same title, the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present disclosure relates generally to an attachment apparatus for use with ear-fitting headphones such as, for example, wireless headphones with a cylindrical outer housing (e.g., Apple AirPods®).

DESCRIPTION OF RELATED TECHNOLOGY

The use of wired or wireless headphones are well understood. Traditionally, these headphones came in a variety of shapes and sizes including circumaural headphones (i.e., over-ear headphones), supra-aural headphones (i.e., on-ear headphones), and so-called ear-fitting headphones that are designed to be fitted directly in the outer ear of the wearer. More recently, ear-fitting headphones have become smaller and more capable. For example, Apple AirPods® were introduced in late 2016 and, in addition to playing audio, featured a built-in microphone. The AirPods® design incorporates a unique aesthetic design feature, namely its cylindrical housing that protrudes down from the wearer's ear. Continuous and repetitive exposure to this untraditional design aesthetic has led to widespread acceptance for this product. As a result of this widespread acceptance, opportunities now exist for the introduction of unique functional and/or design aesthetics to compliment this untraditional design paradigm.

SUMMARY

The present disclosure provides for an attachment apparatus for an ear-fitting headphone attachment apparatus, as well as methods for manufacturing and using the same.

In one aspect, an attachment apparatus for attachment to a cylindrical housing located on an ear-fitting headphone is disclosed. In one embodiment, the attachment apparatus includes: an elastomeric sleeve; a compression clamp disposed external to the elastomeric sleeve, the compression clamp having a hinge and a fastening mechanism; and an attachment point located on the compression clamp for attachment of decorative items thereto.

In one variant, the elastomeric sleeve includes a cylindrical shape having a cylindrical cavity disposed within the cylindrical shape, the cylindrical cavity having a diameter, the diameter of the cylindrical cavity being greater than a diameter of the cylindrical housing located on the ear-fitting headphone.

In another variant, the compression clamp is configured to compress the cylindrical shape of the elastomeric sleeve when the compression clamp is locked within a closed position, the compression of the cylindrical shape securely attaching the attachment apparatus to the cylindrical housing located on the ear-fitting headphone.

In yet another variant, the compression clamp has a C-shape with the hinge residing on a diametrically opposed side of the compression clamp from the fastening mechanism.

In yet another variant, the fastening mechanism includes a plurality of interdigitated extensions, at least a portion of the plurality of interdigitated extensions having a rod portion as well as an end portion, the end portion having a spherical shape with a diameter that is larger than a diameter of the rod portion, the end portion being configured to interlock with another end portion of another interdigitated extension.

In yet another variant, the elastomeric sleeve has a cylindrical C-shape having a cylindrical cavity disposed within the cylindrical C-shape, the cylindrical cavity having a diameter when the cylindrical C-shape of the elastomeric sleeve is closed, the diameter of the cylindrical cavity being less than a diameter of the cylindrical housing located on the ear-fitting headphone.

In yet another variant, the elastomeric sleeve is securely attached to the compression clamp, the compression clamp is configured to compress the cylindrical shape of the elastomeric sleeve when the compression clamp is locked within a closed position, the compression of the cylindrical shape securely attaching the attachment apparatus to the cylindrical housing located on the ear-fitting headphone.

In yet another variant, the compression clamp includes a C-shaped clamp with the hinge residing on a diametrically opposed side of the compression clamp from the fastening mechanism.

In yet another variant, the fastening mechanism includes a plurality of interdigitated extensions, at least a portion of the plurality of interdigitated extensions having a rod portion as well as an end portion, the end portion having a spherical shape with a diameter that is larger than a diameter of the rod portion, the end portion being configured to interlock with two end portions of two other interdigitated extensions.

In another embodiment, the attachment apparatus includes: a coiled wire that is configured to fit over the cylindrical housing located on the ear-fitting headphone and an attachment point located on the coiled wire for attachment of decorative items thereto.

In one variant, the coiled wire varies in circumference between a top portion of the coiled wire and a bottom portion of the coiled wire, the top portion having a larger circumference as compared with the circumference for the bottom portion of the coiled wire.

In another variant, the coiled wire has a top portion and a bottom portion, the coiled wire having a diameter dimension associated with the coiled wire, wherein the diameter dimension increases as the top portion and the bottom portion of the coiled wire are compressed towards one another, and wherein the diameter dimension decreases as the top portion and the bottom portion of the coiled wire are stretched away from one another.

In yet another variant, the attachment point is located on the bottom portion of the coiled wire and the attachment of a decorative item to the attachment point causes the diameter dimension of the coiled wire to decrease such that the coiled wire includes an interference fit with the cylindrical housing located on the ear-fitting headphone.

In yet another variant, the attachment apparatus further includes an extruded or injection molded tube of flexible material, the extruded or injection molded tube of flexible material configured to be disposed between the coiled wire and the cylindrical housing located on the ear-fitting headphone.

In yet another variant, the coiled wire includes a top portion and a bottom portion, the coiled wire having a diameter dimension associated with the coiled wire, wherein the diameter dimension decreases as the top portion and the bottom portion of the coiled wire are stretched away from one another, the decreasing diameter dimension being configured to compress the extruded or injection molded tube of flexible material onto the cylindrical housing located on the ear-fitting headphone.

In yet another variant, the stretching of the top portion and the bottom portion of the coiled wire is caused by attachment of a decorative item onto the attachment point.

In yet another embodiment, an attachment apparatus for attachment to a cylindrical housing located on an ear-fitting headphone is disclosed.

In one variant, the attachment apparatus includes an extruded or injection molded tube of material, a wire wraps around the tube of material, the wire residing around an outside perimeter of the tube of material and entering into the tube of material where it exits at a bottom portion of the tube of material, the wire including an attachment point for the attachment of a decorative item.

In another variant, the attachment apparatus includes a woven textile having a crosshatch pattern associated therewith, the woven textile having an attachment point for the attachment of a decorative item.

In yet another variant, the attachment apparatus includes thin metal strips that collectively have a crosshatch pattern associated therewith, the thin metal strips having an attachment point for the attachment of a decorative item.

In another aspect, systems consisting of an ear-fitting headphone and the aforementioned attachment apparatus are disclosed. In one embodiment, the system further consists of a decorative item attached to the attachment apparatus.

In yet another aspect, methods of using the aforementioned attachment apparatus are disclosed.

In yet another aspect, methods of manufacturing the aforementioned attachment apparatus are disclosed.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the disclosure will become more apparent from the detailed description set forth below when taken in conjunction with the drawings, wherein.

All Figures disclosed herein are © Copyright 2019-2020 D Squared Ventures. All rights reserved.

Exemplary Ear-Fitting Headphone Attachment Apparatus

Implementations of the present disclosure will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the same reference numbers will be used throughout the drawings to refer to same or like parts.

Figure 1A:
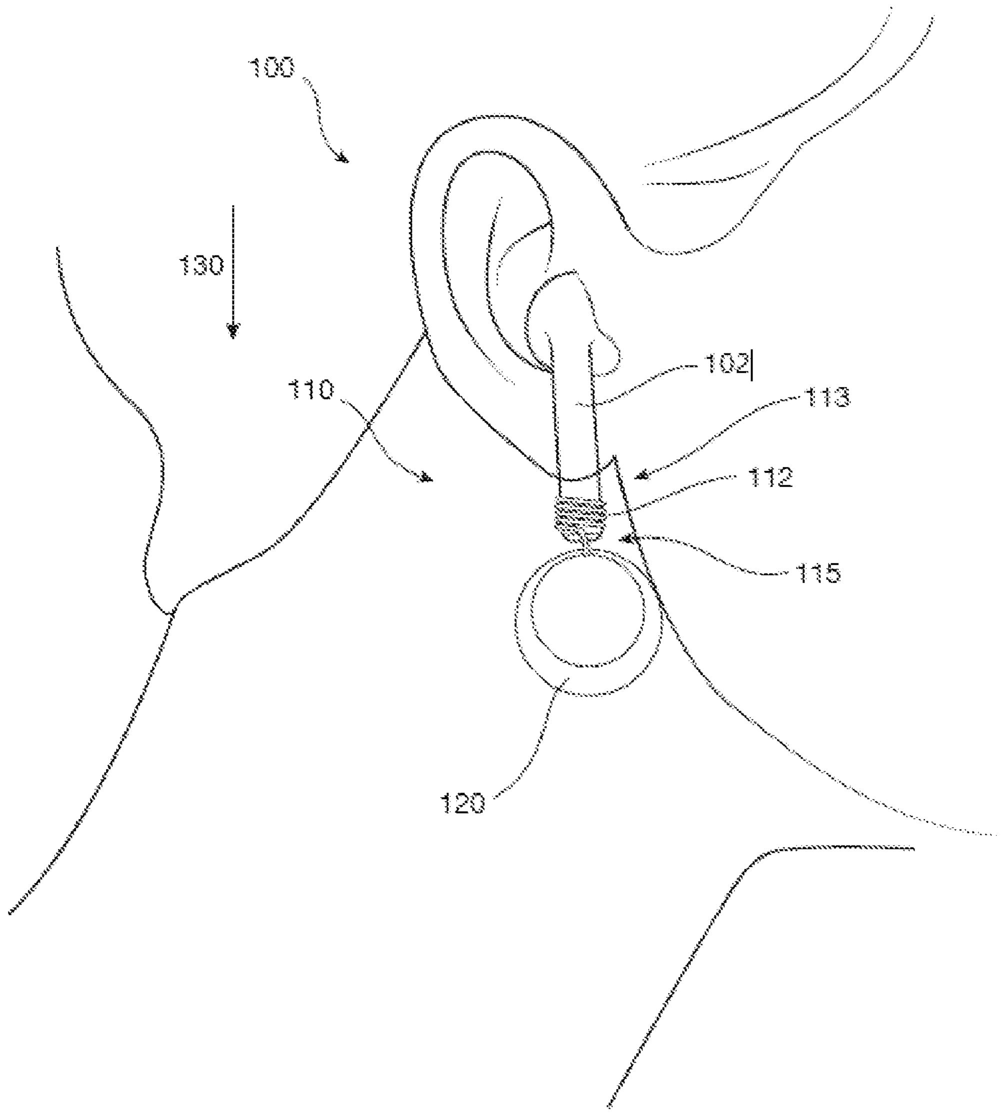
FIG. 1A is a front elevational view of first exemplary attachment apparatus for use with an ear-fitting headphone design, in accordance with the principles of the present disclosure.
Figure 1B:
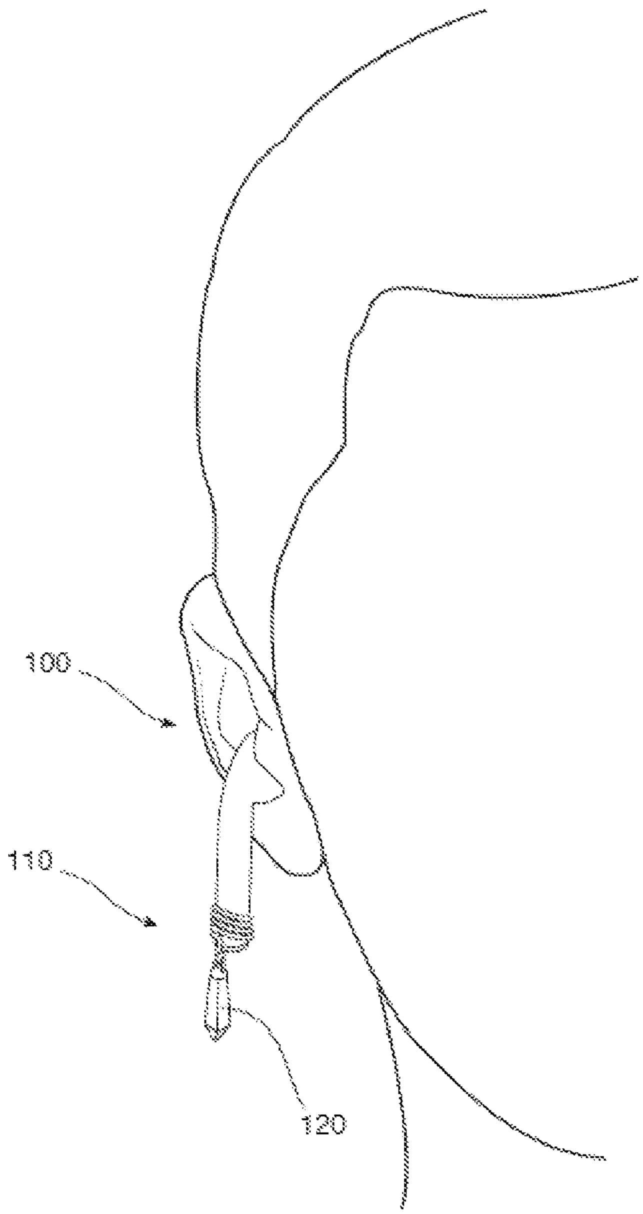
FIG. 1B is a perspective view of the attachment apparatus of FIG. 1A, in accordance with the principles of the present disclosure.

Referring now to FIGS. 1A-1B, one exemplary attachment apparatus 110 for use with an ear-fitting headphone 100 with a cylindrical housing 102 is shown and described in detail. The illustrated attachment apparatus 110 includes coiled wire 112, made from metal and/or plastic of suitable mechanical properties, of proper interference dimension which slides onto and over the cylindrical housing 102 of the ear-fitting headphone 100. The coiled wire 112 may be colored, bejeweled, glittered and/or have any manner of finish for cosmetic purpose. Additionally, the coiled wire 112 may be wound either clockwise or counterclockwise.

Figure 1C:
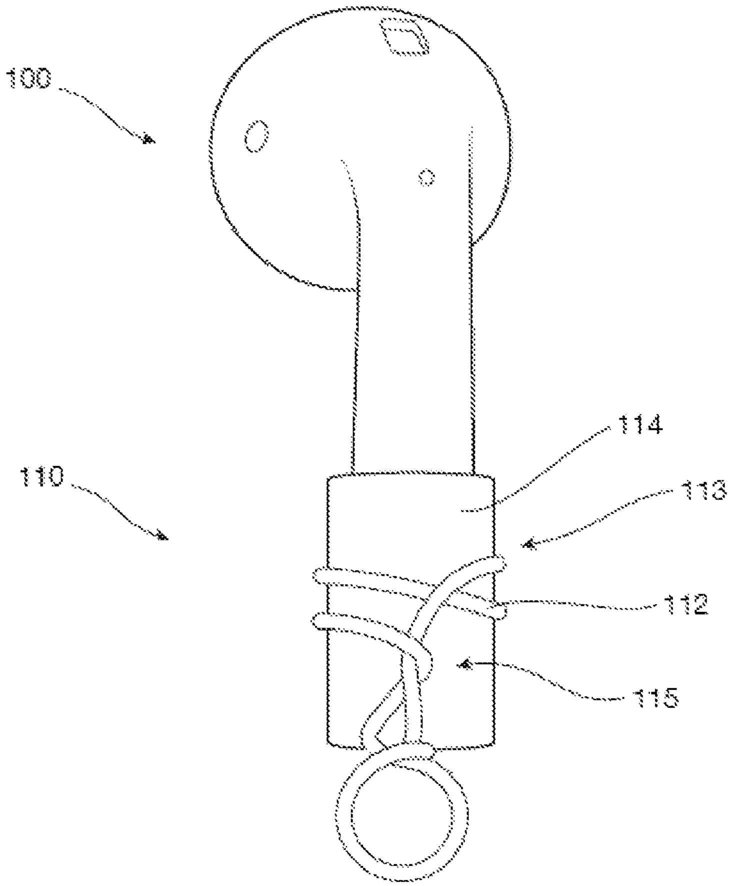
FIG. 1C is a perspective view of a second exemplary attachment apparatus, in accordance with the principles of the present disclosure.

FIG. 1C illustrates another exemplary attachment apparatus 110 that is similar to the attachment apparatus shown with respect to FIGS. 1A-1B. However, in the embodiment illustrated in FIG. 1C, the attachment apparatus 110 may consist of an extruded or injection molded tube 114 of silicone, ethylene-vinyl acetate (EVA), thermoplastic polyurethane (TPU), and/or any other suitable (or similar) types of materials. The length of the extruded or injection molded tube 114 may have any number of suitable lengths. The coiled wire 112 illustrated in FIG. 1C consists of a single wire which is wrapped around the extruded or injection molded tube 114 in approximately two revolutions (i.e., approximately 720°). However, it would be readily appreciated that the number of revolutions may consist of three or more revolutions in some implementations. The top 113 of the coiled wire 112 may continue towards the bottom 115 of the coiled wire 112, where an attachment point may be created for the attachment of a decorative item 120.

The coiled wire 112 in FIGS. 1A-1C may vary in circumference between the top 113 and bottom 115 of the attachment apparatus 110 in some implementations. For example, the coiled wire 112 may have a larger circumference towards the top 113 of the coiled wire 112, while having a smaller circumference towards the bottom 115 of the coiled wire 112. Such a variant may assist with the insertion of the coiled wire 112 onto the cylindrical housing 102 as less interference may be experienced with the insertion of the top portion 113 of the coiled wire 112, with increasing amounts of interference towards the bottom portion 115 of the coiled wire 112. While the use of coiled wire 112 having varying circumferential dimensions is exemplary, it would be readily apparent to one of ordinary skill given the contents of the present disclosure that other dimensional schemes may be utilized.

For example, in some implementations, the circumference of the top portion 113 of the coiled wire 112 may have the same, or a nearly identical circumference—within normal manufacturing tolerances, as the bottom portion 115 of the coiled wire 112 (as well as other portions of the coiled wire). In such a variant, the interference dimension of the circumference of the coiled wire 112 may be such that the coiled wire 112 may be readily inserted over and onto the cylindrical housing.

In some variants, the circumference of the coiled wire 112 may be varied by compressing the top portion 113 of the coiled wire 112 toward the bottom portion 115 of the coiled wire 112. For example, the circumference of the coiled wire 112 may increase as the top portion 113 is compressed towards the bottom portion 115 of the coiled wire 112. Accordingly, a user of the attachment apparatus 110 may compress the coiled wire 112 in order to place the coiled wire 112 onto the cylindrical housing 102. The user of the attachment apparatus 110 may then release the compression once the coiled wire 112 has been disposed over the cylindrical housing 102, thereby resulting in a "snug-fit" of the attachment apparatus 110 to the cylindrical housing 102. In some variants, a combination of varying circumference dimensions for the coiled wire 112, as well as compression of the top portion 113 towards the bottom portion 115 may be utilized to facilitate attachment.

Once installed onto the cylindrical housing 102, the grip of the attachment apparatus 110 onto the cylindrical housing 102 will increase as a force is applied to the attachment apparatus 110 in a downward direction 130. In other words, as the bottom 115 of the attachment apparatus 110 is stretched away from the top 113 of the attachment apparatus 110, the attachment apparatus' 110 grip on the cylindrical housing 102 may increase. This force in the downward direction 130 may be applied by the weight of the decorative element 120. This property of increasing interference when the coiled wire 112 is placed under tension and decreasing interference when the coiled wire 112 is compressed may assist with the adornment of decorative items 120 to the ear-fitting headphone 100. The attachment of the decorative items 120 may be accomplished with a hook and loop mechanism, magnets, or any other suitable means of attachment of decorative items 120 to the attachment apparatus 110.

The types of decorative items 120 that may be attached to the attachment apparatus 110 are virtually limitless and may be chosen based on the preferences of the wearer. For example, the decorative item 120 may consist of a hoop-style decorative item that may come in the form of a wide variety of sizes and shapes such as circular shapes, square shapes, oval shapes, triangle shapes, and the like. The decorative item 120 may consist of a drop-style decorative item which may consist of a stud towards the attachment point of the decorative item 120 to the attachment apparatus with a decorative portion hanging below the attachment point. The decorative item 120 may consist of a dangle-style decorative item which may be similar to a drop-style decorative item but may have design elements which are free to swing back and forth. These and other types of decorative items 120 may be readily attached to the attachment apparatus and may consist of differing types of materials (e.g., gold, silver, platinum, steel, plastic, wood and the like), as well as being adorned with any number of types of precious stones (e.g., diamonds, rubies, sapphires, emeralds, and the like) and/or semi-precious stones (e.g., amethyst, garnet, pearl, turquoise, and the like).

Figure 2:
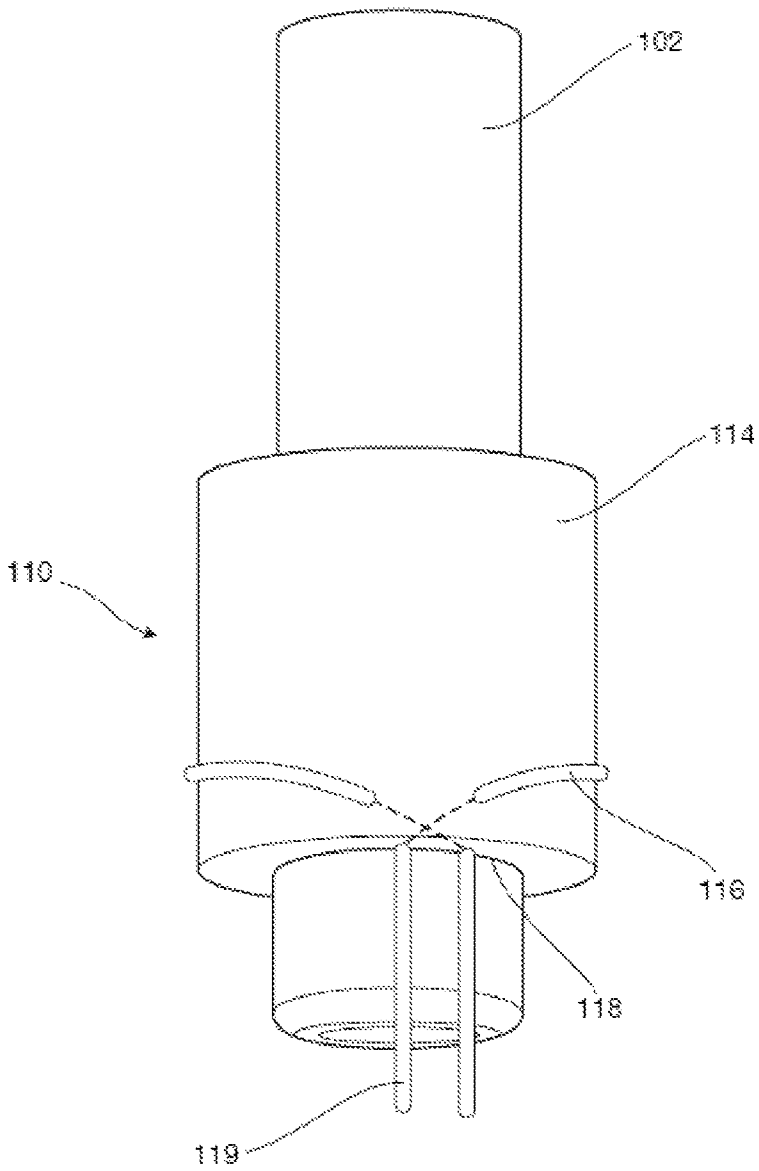
FIG. 2 is a perspective view a third exemplary attachment apparatus, in accordance with the principles of the present disclosure.
Figure 3A:
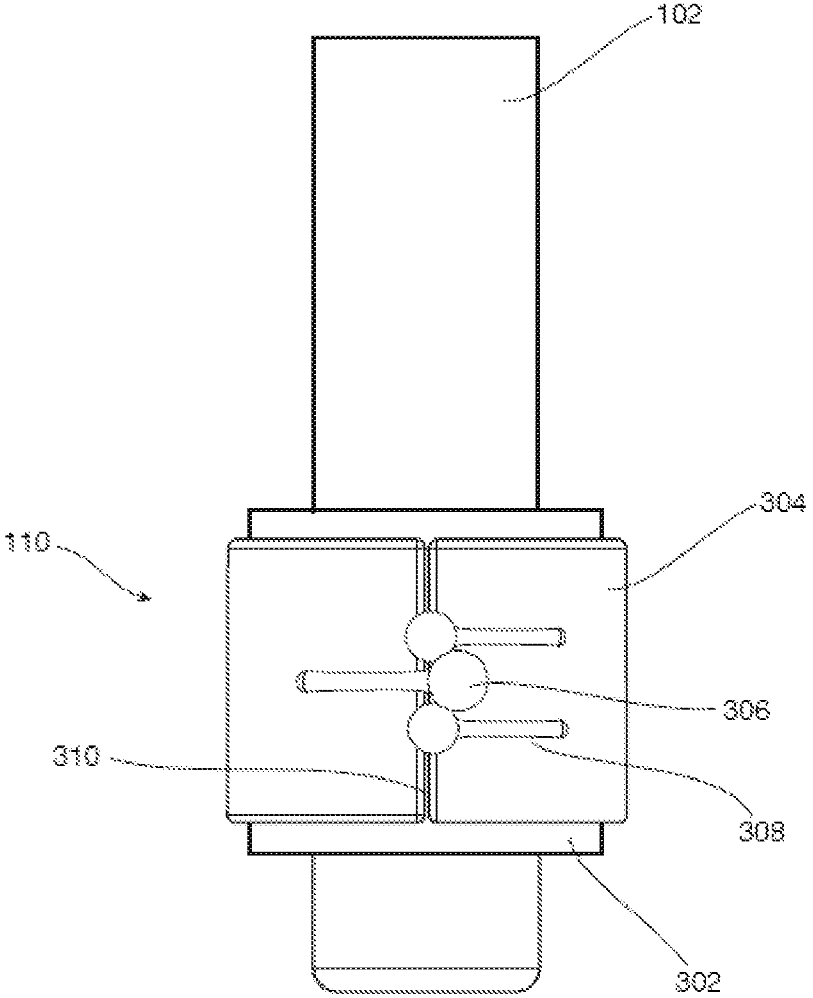
FIG. 3A is a front plan view of a fourth exemplary attachment apparatus, in accordance with the principles of the present disclosure.
Figure 3B:
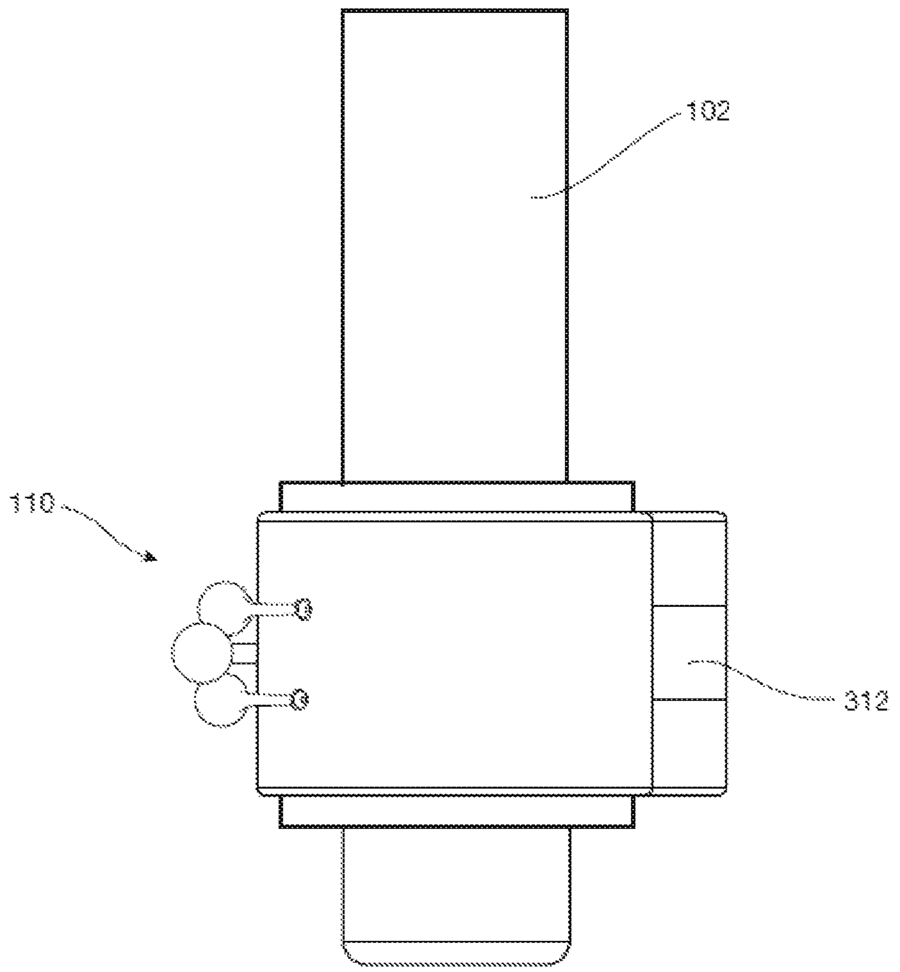
FIG. 3B is a right-side plan view of the attachment apparatus of FIG. 3A, in accordance with the principles of the present disclosure.
Figure 3C:
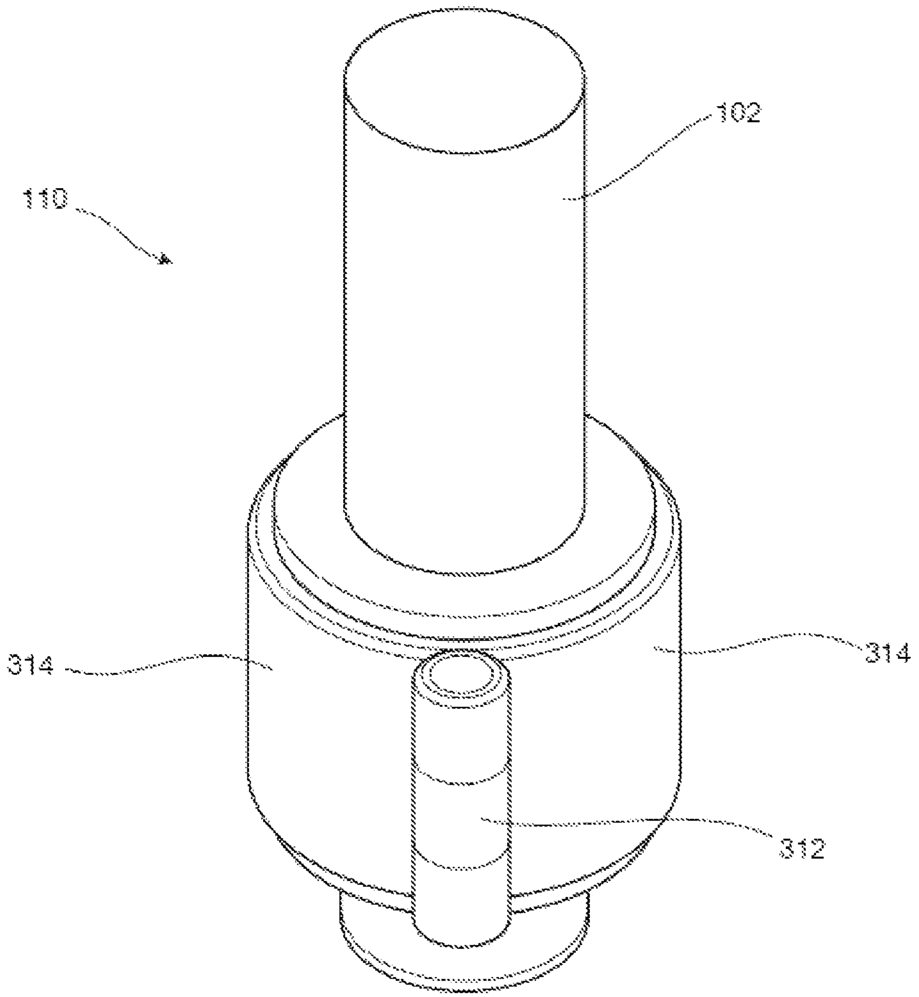
FIG. 3C is a back-side perspective view of the attachment apparatus of FIG. 3A, in accordance with the principles of the present disclosure.
Figure 3D:
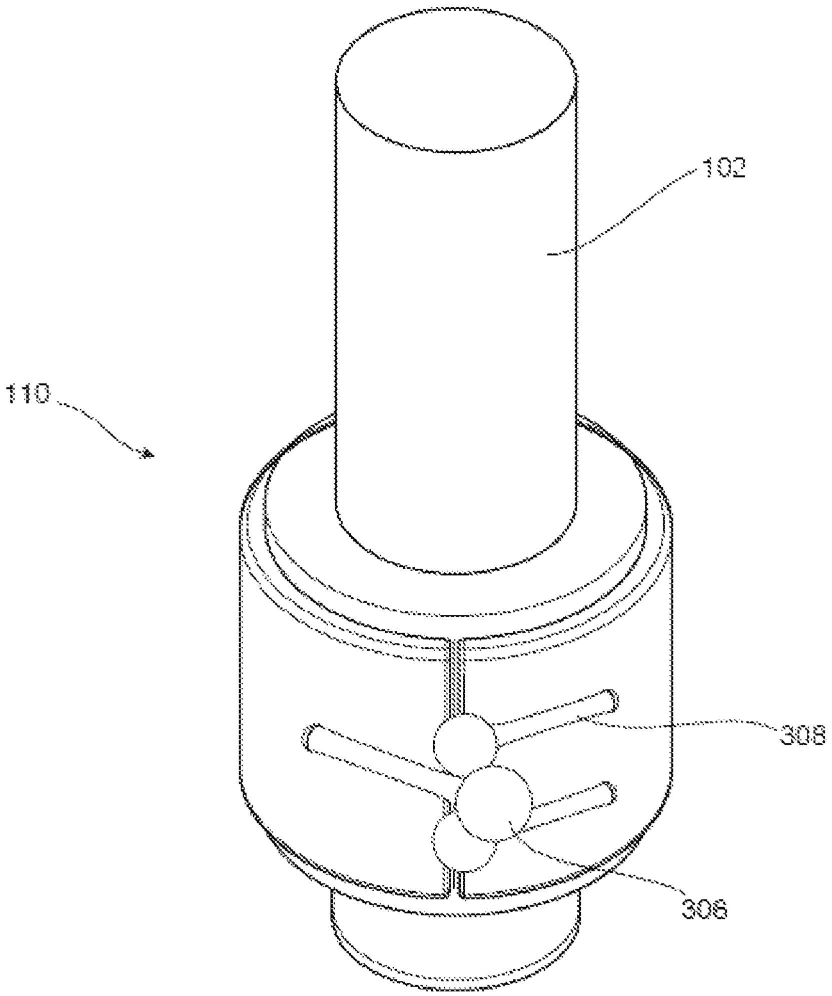
FIG. 3D is a front-side perspective view of the attachment apparatus of FIG. 3A, in accordance with the principles of the present disclosure.
Figure 3E:
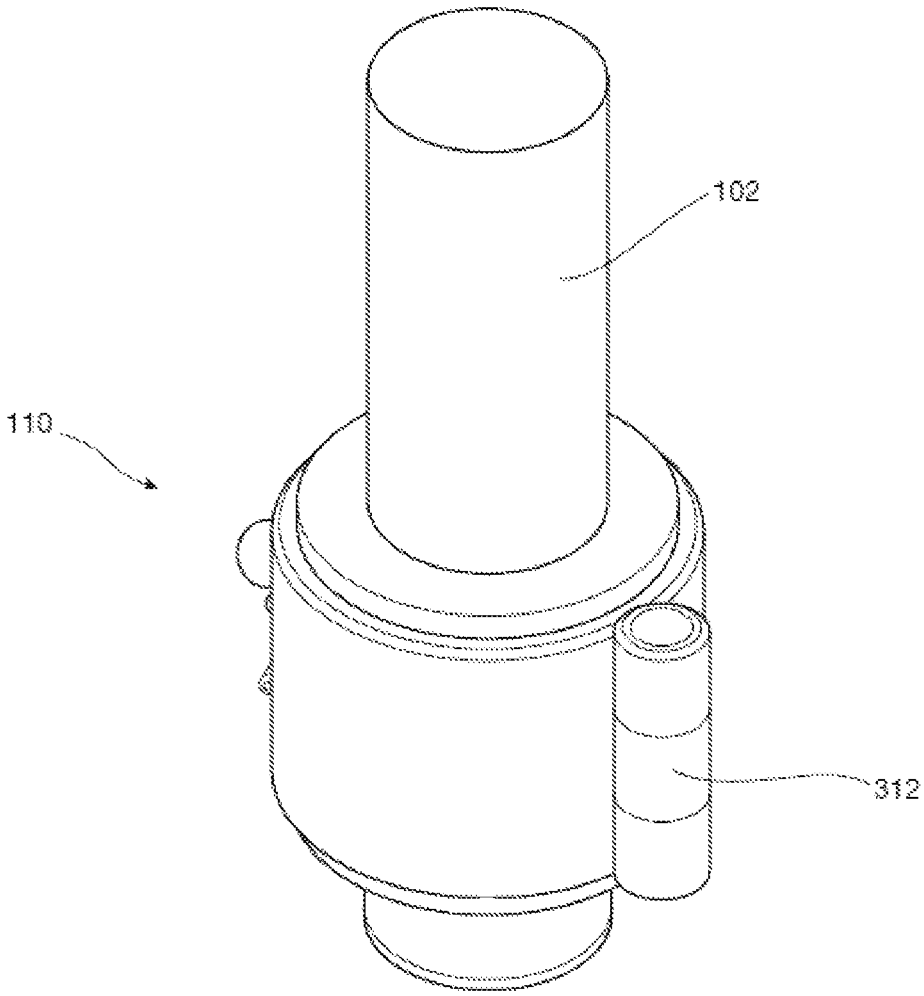
FIG. 3E is a right-side back perspective view of the attachment apparatus of FIG. 3A, in accordance with the principles of the present disclosure.
Figure 3F:
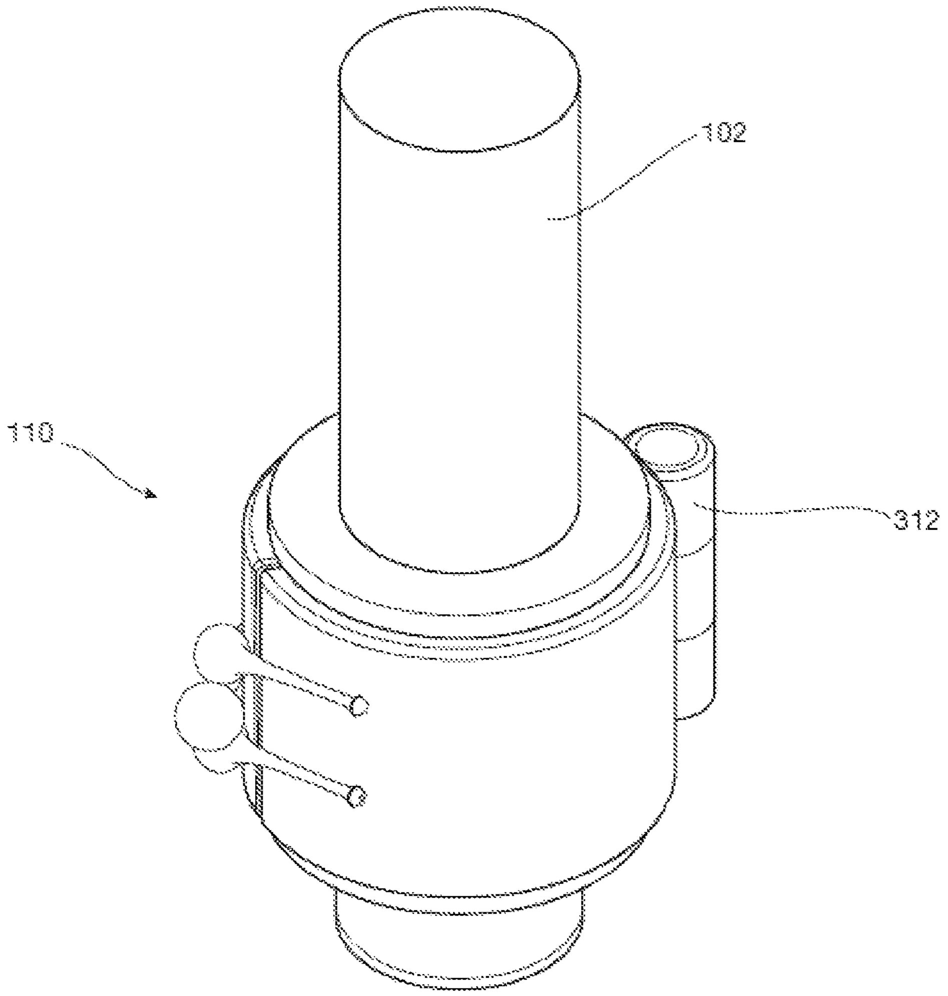
FIG. 3F is a right-side front perspective view of the attachment apparatus of FIG. 3A, in accordance with the principles of the present disclosure.

Referring now to FIG. 2, another variant of an attachment apparatus 110 is shown and described in detail. In this illustrated variant, the attachment apparatus 110 may consist of an extruded or injection molded tube 114 of silicone, EVA, TPU, and/or any other suitable (or similar) types of materials. The attachment apparatus 110 may be made from any color (or colors), including translucent or transparent colors, may be bejeweled, glittered, and/or coated to provide for a desired finish. This tube 114 of material may be sized so as to have an interference fit with the cylindrical housing 102.

The attachment apparatus 110 may also include one or more wires 116 which may be wrapped around the tube 114 of material. These one or more wires 116 may penetrate the tube 114 of material so that the ends 119 of the wire 116 may exit from the tube 114 adjacent to the cylindrical housing 102 as illustrated in FIG. 2. This wire 116 may exert additional circumferential pressure to the cylindrical housing 102 when pulled downward. For example, the attachment of decorative items 120 to the wire 116 using any of the aforementioned techniques may cause the wire 116 to tighten, resulting in a more snug fit to the cylindrical housing 102 as compared with an attachment apparatus 110 in which the wire 116 is not placed under tension.

In variants in which two or more wires 116 are used, individual ones of the wires 116 may be wound in opposite directions (i.e., counterclockwise, and clockwise). The use of two or more wires 116 may be utilized in order to create a different suspension effect off of the cylindrical housing 102 as compared with a single wire variant 116. In addition to, or alternatively then, the different suspension effect, two or more wires 116 may also be utilized to create a decorative pattern or for other aesthetic effect for the attachment apparatus 110. These and other variants would be readily apparent to one of ordinary skill given the contents of the present disclosure.

In some implementations, the attachment apparatus 110 may take the form of a woven textile and/or thin strips of material such as metal, polymers and the like, that collectively form a tube of proper interference dimension for the cylindrical housing 102. The woven textile and/or thin strips may utilize a crosshatch pattern which provides for additional interference fit with the cylindrical housing 102 when the tube is placed under tension (e.g., through the addition of decorative items 120 attached thereto). In other words, the woven textile and/or thin strips may collectively behave such that additional circumferential pressure is applied when the tube is placed under tension (e.g., through the attachment of decorative items 120) around the cylindrical housing 102.

Referring now to FIGS. 3A-3F, yet another variant of an attachment apparatus 110 is shown and described in detail. Specifically, the attachment apparatus 110 may include, for example, an elastomeric sleeve 302 that is configured to be positioned around the cylindrical housing 102 of an ear-fitting headphone 100. However, in some implementations the sleeve 302 may not initially have an interference dimension with the cylindrical housing 102 so that the sleeve 302 may easily slide over the cylindrical housing 102. The sleeve 302 may be formed from silicone, EVA, TPU, and/or any other suitable (or similar) types of materials. The attachment apparatus 110 may also include a compression clamp 304 that is configured to have one or more openings 310. One purpose for the compression clamp 304 is to apply external pressure to the sleeve 302 when the compression clamp 304 is closed as illustrated in, for example, FIG. 3A. This externally applied pressure may prevent the attachment apparatus 110 from releasing from the cylindrical housing 102. The sleeve 302 may be unattached to the compression clamp 304, may be removably attached to the compression clamp 304, or may be permanently attached to the compression clamp 304. For example, in instances in which the sleeve 302 is permanently attached, the sleeve 302 may be "C-shaped" and may be secured to the compression clamp 304 using adhesives or epoxies. These and other variations would be readily apparent to one of ordinary skill given the contents of the present disclosure.

The compression clamp 304 may also include interdigitated extensions 308 with ends 306 that are configured to interlock thereby "closing" the compression clamp 304 around the sleeve 302. As illustrated, the ends 306 are spherical in shape, although it would be readily appreciated that the ends 306 may take on a variety of other forms including polygon or rounded shapes in some implementations, so long as the interdigitated extensions 308 are configured to "lock" together, thereby holding the compression clamp 304 closed when desired. As illustrated, the number of interdigitated extensions 308 may be three (3), with the two outer interdigitated extensions 308 residing on one end of the clamp opening 310 and the internal interdigitated extension 308 residing on the other end of the clamp opening 310. However, other contemplated variations may include four (4) or more interdigitated extensions 308 on the attachment apparatus 110. The compression clamp 304, interdigitated extensions 308 with ends 306, and/or the sleeve 302 may be decorative in nature. For example, the compression clamp may be plated or colored so as to resemble (or be formed from) precious metals such as gold, silver, platinum, etc. The ends 306 may resemble (or be formed from) precious or non-precious stones such as diamonds, rubies, sapphires, emeralds, etc. Moreover, the sleeve 302 may project past the ends of the compression clamp 304 as shown, although it would be readily appreciated that in some implementations, the sleeve 302 may remain hidden from view underneath the compression clamp 304 in some implementations. These and other decorative variations would be readily apparent to one of ordinary skill given the contents of the present disclosure.

While the use of interdigitated extensions 308 with ends 306 is exemplary, it would be readily apparent to one of ordinary skill given the contents of the present disclosure that these interdigitated extensions 308 may be obviated, or used in combination with, other closures including, for example, frictional elements, detents, latches, clasps, magnets, chains, ratchet mechanisms, hasps, catches, draw latches and/or other types of fasteners. As is shown in FIGS. 3B, 3C, 3E and 3F, the attachment apparatus may include a hinge 312 that is located opposite from the clamp opening 310. In some implementations, the hinge 312 may be obviated in favor of, for example, another clamp opening 310 and fastening mechanism (e.g., interdigitated extensions 308 with ends 306) such that the two halves of the compression clamp 304 may be effectively "snapped" together.

An attachment element (not shown) may be located at any location (or multiple locations) of the compression clamp 304 including the sides (314, FIG. 3C), the hinge 312 (or adjacent the hinge 312), and/or on or adjacent the fastening mechanism (e.g., interdigitated extensions 308 with ends 306). The purpose of this attachment element is for the securing of decorative elements 120 to the attachment apparatus 110. Similar to that described elsewhere herein, the types of decorative items 120 that may be attached to the attachment apparatus 110 are virtually limitless and may be chosen based on the preferences of the wearer. For example, the decorative item 120 may consist of a hoop-style decorative item that may come in the form of a wide variety of sizes and shapes such as circular shapes, square shapes, oval shapes, triangle shapes, and the like. The decorative item 120 may consist of a drop-style decorative item which may consist of a stud towards the attachment point of the decorative item 120 to the attachment apparatus with a decorative portion hanging below the attachment point. The decorative item 120 may consist of a dangle-style decorative item which may be similar to a drop-style decorative item but may have design elements which are free to swing back and forth. These and other types of decorative items 120 may be readily attached to the attachment apparatus and may consist of differing types of materials (e.g., gold, silver, platinum, steel, plastic, wood and the like), as well as being adorned with any number of types of precious stones (e.g., diamonds, rubies, sapphires, emeralds, and the like) and/or semi-precious stones (e.g., amethyst, garnet, pearl, turquoise, and the like).

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. An attachment apparatus for attachment to a cylindrical housing located on an ear-fitting headphone, wherein the attachment apparatus comprises:

an extruded or injection molded tube of material, the tube of material comprising a cylindrical shape with a hole for receiving the cylindrical housing located on the ear-fitting headphone passing through the cylindrical shape; and one or more wires, the one or more wires being wrapped around the tube of material, the one or more wires residing around an outside perimeter of the tube of material.

2. The attachment apparatus of claim 1, wherein the one or more wires penetrate into the tube of material from an outside perimeter of the tube of material where the one or more wires then exits at a bottom portion of the tube of material, the one or more wires further comprising an attachment point for attachment of a decorative item.

3. The attachment apparatus of claim 2, wherein the bottom portion of the tube of material comprises a surface that is orthogonal with a surface that makes up the outside perimeter of the tube of material.

4. The attachment apparatus of claim 3, wherein the one or more wires cross over within the tube of material.

5. The attachment apparatus of claim 4, wherein the one or more wires exert circumferential pressure on the outside perimeter of the tube of material when the one or more wires are placed under tension.

6. The attachment apparatus of claim 3, wherein the hole for receiving the cylindrical housing located on the ear-fitting headphone comprises an interference dimension with the cylindrical housing located on the ear-fitting headphone.

7. The attachment apparatus of claim 2, wherein the one or more comprises two or more wires, wherein a first one of the two or more wires is wrapped around the outside perimeter of the tube of material in a clockwise orientation and a second one of the two or more wires is wrapped around the outside perimeter of the tube of material in a counter-clockwise orientation.

8. The attachment apparatus of claim 1, wherein a first section of the one or more wires passes over a second section of the one or more wires and wherein the first section of the one or more wires passes under a third section of the one or more wires.

9. The attachment apparatus of claim 8, wherein the first section of the one or more wires is disposed further away from the hole for receiving the cylindrical housing as compared with the second section of the one or more wires when passing over the second section of the one or more wires.

10. The attachment apparatus of claim 9, wherein the first section of the one or more wires is disposed closer to the hole for receiving the cylindrical housing as compared with the third section of the one or more wires when passing under the third section of the one or more wires.

11. The attachment apparatus of claim 10, wherein the one or more wires is wrapped around the tube of material in at least two revolutions.

12. The attachment apparatus of claim 1, wherein the one or more wires is wrapped around the tube of material in at least two revolutions.

13. The attachment apparatus of claim 12, wherein a first section of the one or more wires passes over a second section of the one or more wires and wherein the first section of the one or more wires passes under a third section of the one or more wires.

14. The attachment apparatus of claim 13, wherein the first section of the one or more wires is disposed further away from the hole for receiving the cylindrical housing as compared with the second section of the one or more wires when passing over the second section of the one or more wires.

15. The attachment apparatus of claim 14, wherein the first section of the one or more wires is disposed closer to the hole for receiving the cylindrical housing as compared with the third section of the one or more wires when passing under the third section of the one or more wires.

16. The attachment apparatus of claim 1, wherein the one or more wires crosses over itself within an interior of the tube of material.

17. The attachment apparatus of claim 16, wherein the interior of the tube of material is disposed between the hole for receiving the cylindrical housing and an outside perimeter of the tube of material.

18. The attachment apparatus of claim 17, wherein the one or more wires penetrate into the tube of material from the outside perimeter of the tube of material where the one or more wires then exits at a bottom portion of the tube of material, the one or more wires further comprising an attachment point for attachment of a decorative item.

19. The attachment apparatus of claim 18, wherein the bottom portion of the tube of material comprises a surface that is orthogonal with a surface that makes up the outside perimeter of the tube of material.

* * * * *